(12) United States Patent
Wu et al.

(10) Patent No.: US 12,468,366 B2
(45) Date of Patent: Nov. 11, 2025

(54) POWER SUPPLY WITH OUTPUT PORT STATUS MONITORING MODULE

(71) Applicant: SEA SONIC ELECTRONICS CO., LTD., Taipei (TW)

(72) Inventors: Wei-Chen Wu, Taipei (TW); Wen-Hau Hu, Taipei (TW); Hung-Wei Yang, Taipei (TW); Cheng-Yung Lo, Taipei (TW); Yu-Hao Su, Taipei (TW); Jian-Zhi Huang, Taipei (TW)

(73) Assignee: SEA SONIC ELECTRONICS CO., LTD., Taipei (TW)

( * ) Notice: Subject to any disclaimer, the term of this patent is extended or adjusted under 35 U.S.C. 154(b) by 232 days.

(21) Appl. No.: 17/981,032

(22) Filed: Nov. 4, 2022

(65) Prior Publication Data

US 2024/0152193 A1   May 9, 2024

(51) Int. Cl.
*G06F 1/28* (2006.01)

(52) U.S. Cl.
CPC ....................... *G06F 1/28* (2013.01)

(58) Field of Classification Search
None
See application file for complete search history.

(56) References Cited

U.S. PATENT DOCUMENTS

| 2009/0174566 A1* | 7/2009 | Volk | H04H 20/59 340/691.5 |
| 2011/0271155 A1* | 11/2011 | Tran | H04L 1/244 714/704 |
| 2015/0015184 A1* | 1/2015 | Su | H02J 7/00304 320/107 |
| 2017/0192064 A1 | 7/2017 | Peng | |
| 2021/0240241 A1* | 8/2021 | Knapton | G06F 1/10 |

FOREIGN PATENT DOCUMENTS

| TW | 435893 U | 5/2001 |
| TW | M286413 U | 1/2006 |
| TW | I284797 B | 8/2007 |
| TW | 201546606 A | 12/2015 |
| TW | 202105879 A | 2/2021 |

\* cited by examiner

*Primary Examiner* — Fahmida Rahman
(74) *Attorney, Agent, or Firm* — MUNCY, GEISSLER, OLDS & LOWE, P.C.

(57) ABSTRACT

The invention provides a power supply including at least one power output port, at least one status alert component, and at least one output port status monitoring module. The status alert component generates at least one visual prompt based on an alert signal. The output port status monitoring module includes at least one temperature sensor adjacent to the power output port, a microcontroller connected to the temperature sensor and sensing an output current from the power output port, and a reset signal generator connected to the microcontroller. The microcontroller comprises at least one port status alert condition that takes a temperature and the output current of the power output port as decision factors. The microcontroller outputs the alert signal to the status alert component when the port status alert condition is met and maintains the status until a reset signal provided by the reset signal generator is received.

11 Claims, 10 Drawing Sheets

POWER SUPPLY WITH OUTPUT PORT STATUS MONITORING MODULE

FIELD OF THE INVENTION

The present invention relates to a power supply with an output port status monitoring module, and more particularly, to a power supply with a status alert component that disables its alert only when a microcontroller receives a reset signal.

BACKGROUND OF THE INVENTION

There are various types of power supplies with status indicators that provide status prompts, such as those in patents numbered TW 1284797, US 2017192064A, TW M286413, TW 202105879, TW 435893, and TW 201546606.

TW 1284797 describes a power supply performing power sensing for each load and indicating the load status with a light sign. However, those skilled in the field of power supplies surely know that detecting the power of a load is mainly to detect an output current in an output circuit with a detection component, and then determine the load on the basis of a value of the current. In addition, TW 202105879 and US 2017192064A are also those where an electric current is taken as a decision factor of a power supply status indicator.

Furthermore, TW M286413 discloses a power supply that has a control circuit connected to an internal fan, where the control circuit is provided with a temperature sensor. In TW M286413, a user is reminded by a light signal of the temperature of the power supply he/she sets, and when the temperature sensor senses that the temperature of the control circuit reaches the user's set temperature, the fan starts to operate. It can be seen therefrom that in the case of TW M286413, the power supply temperature is taken as the decision factor of the power supply status indicator.

However, the conventional status indicator can only provide a prompt function when the power supply is on, and the prompt function of the status indicator is disabled once the power supply is completely off and restarted. In practice, the current power supply is mostly provided with a protection mechanism, and when the power supply reaches a condition where the protection mechanism is triggered, the power supply provides a warning in such a way that a prompt light is on and a screen display shows something, and at the same time enters an autonomous management and control state. In the autonomous management and control state, a control unit in the power supply forces components to be in operation, and even forces the power supply to be shut down and restarted so that the power supply temporarily stops operating. For example, a critical current protection may be provided in the power supply, the output current from an output port may be forcibly reduced when the output current from the output port triggers the critical current protection; an overcurrent protection may be provided in the power supply, and the power supply may be forcibly shut down when the output current from the output port triggers the overcurrent protection, thereby halting the operation of the output port. However, in the autonomous management and control state, most users shut down the power supply directly, and forcibly disable the protection mechanism. In this way, it is impossible to require that the user should perform a preliminary inspection of the power supply. Furthermore, after the current power supply is automatically powered off and restarted, the indicator cannot hold its prompt; as a result, the conventional power supply cannot prompt the user to perform an inspection.

SUMMARY OF THE INVENTION

It is a primary object of the invention to solve the problem that the conventional warning device cannot hold the alert after the power supply is powered off and then restarted.

To achieve the above object, the invention provides a power supply with an output port status monitoring module, including at least one power output port, at least one status alert component, and at least one output port status monitoring module. The status alert component generates at least one visual prompt which attracts a user's attention based on an alert signal; the output port status monitoring module includes at least one temperature sensor adjacent to the power output port, a microcontroller communicatively connected to the temperature sensor and electrically connected to the power output port to sense an output current from the power output port, and a reset signal generator connected to the microcontroller. The microcontroller stores at least one port status alert condition, and a decision factor of the port status alert condition is defined based on at least one of a temperature and the output current of the power output port, and the microcontroller outputs the alert signal to the status alert component when the port status alert condition is met, and keeps alerting until a reset signal provided by the reset signal generator is received.

In an embodiment, the power supply comprises a shell comprising a hole to which the reset signal generator is fitted.

In an embodiment, the power supply comprises a shell and at least one circuit board provided in the shell, the shell having a hole, the reset signal generator being provided on the circuit board and facing the hole.

In an embodiment, the status alert component is a display screen.

In an embodiment, the power supply comprises a plurality of status alert components, and each of the plurality of status alert components is a light-emitting element.

In an embodiment, the microcontroller is a task management chip of the power supply.

In an embodiment, the power supply includes a plurality of power output ports, and the visual prompt generated by the status alert component is provided for the user to identify to which of the plurality of power output ports the alert is directed, and wherein the output port status monitoring module includes a plurality of temperature sensors, each of the plurality of temperature sensors corresponds to one of the plurality of power output ports.

In addition to the foregoing, the invention also provides another power supply with an output port status monitoring module, including at least one power output port, at least one status alert component, and at least one output port status monitoring module. The status alert component generates at least one visual prompt which attracts a user's attention based on an alert signal; the output port status monitoring module includes at least one temperature sensor adjacent to the power output port, and a microcontroller communicatively connected to the temperature sensor and electrically connected to the power output port to sense an output current from the power output port. The microcontroller stores at least one port status alert condition, and a decision factor of the port status alert condition is defined based on at least one of a temperature and the output current of the power output port, and the microcontroller outputs the alert signal to the status alert component when the port status alert condition is met and keeps alerting until a reset signal provided by an external device is received.

In an embodiment, the external device is a computer host communicatively connected to the power supply.

According to the foregoing embodiments, the invention is more advantageous than the prior art as follows: based on configuration of the output port status monitoring module, the microcontroller of the invention causes the status alert component to generate the visual prompt when the status alert condition of the port is met so that a user is reminded of addressing the exception in the power supply. In addition, according to the invention, after the microcontroller outputs the alert signal, the microcontroller maintains the status until the reset signal is received, whereby the status alert component does not cancel the alert when the power supply is turned off, instead, the status alert component can hold the alert even though the power supply is restarted.

DETAILED DESCRIPTION OF THE PREFERRED EMBODIMENTS

Figure 1:
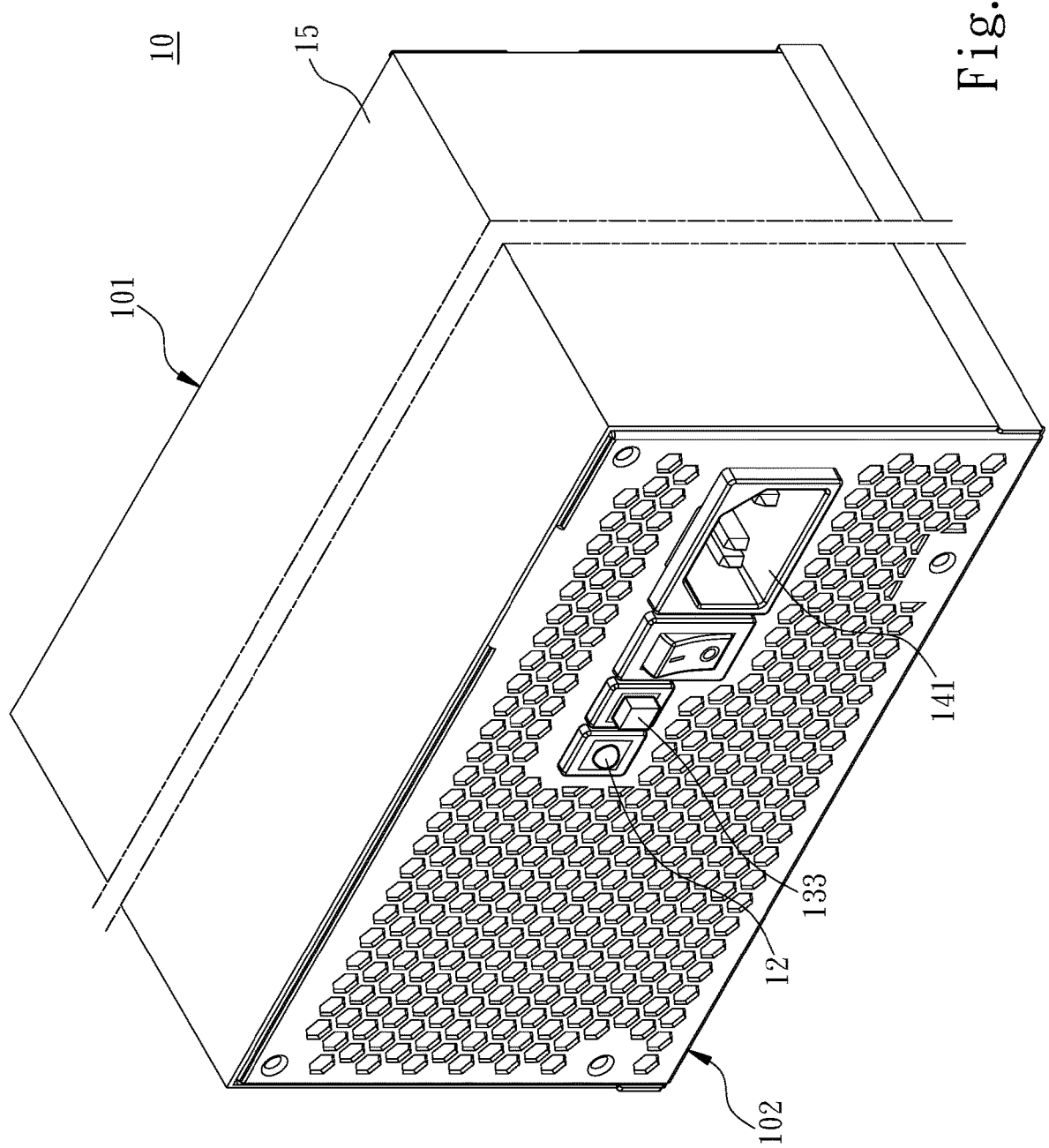
FIG. 1 is a perspective view of a structure of a first embodiment of the present invention.

The technical aspects of the present invention are described in detail below with reference to the drawings.

With reference to FIGS. 1, 2, 3, and 4, the invention provides a power supply 10 including at least one power output port 11, at least one status alert component 12, and at least one output port status monitoring module 13. The power output port 11 is located on an output side 101 of the power supply 10, and the power output port 11 is electrically connected to a power conversion module 14 of the power supply 10. In detail, the power conversion module 14 includes a power input port 141 electrically connected to an external power source, and a power modulation unit 142 connecting the power input port 141 and the power output port 11. Generally, the power input port 141 is located on an input side 102 of the power supply 10, and the input side 102 and the output side 101 are respectively at two ends of the power supply 10, hence the position of the power input port 141 is opposite that of the power output port 11. The power input port 141 is electrically connected to an external power source adapted to AC (alternating current) power, and the power input port 141 derives external power from the external power source. In an embodiment, the power input port 141 is a plug. The power modulation unit 142 receives the external power of the power input port 141 to perform power modulation and outputs operating power to the power output port 11. The power modulation mode of the power modulation unit 142 may be designed according to implementation requirements. For example, in an embodiment, the power modulation unit 142 includes a rectification filter circuit, a power factor correction circuit, a transformer, a pulse width control unit, a switch component, and a rectification output circuit for power modulation. In the implementation, after receiving the external power, the rectification filter circuit converts the external power into DC (direct current) power for output to the power factor correction circuit, and the power factor correction circuit performs power factor correction and harmonic elimination on the DC power; after this, a primary side coil of the transformer is connected to the power factor correction circuit to receive the DC power, and is connected to the switch component; the primary side coil of the transformer determines whether to turn on or off the transformer on the basis of the on-off state of the switch component. The switch component is switched on or off in response to a pulse width modulation signal output by the pulse width control unit, and when the switch component is switched on, the primary side coil and a secondary side coil of the transformer generate magnetic induction, hence the secondary side coil generates inductive power. Thereafter, the rectification output circuit rectifies the induced power, converts the induced power into the operating power, and transmits the operating power to the power output port 11.

Furthermore, the output port status monitoring module 13 includes a temperature sensor 131 adjacent to the power output port 11, a microcontroller 132 communicatively connected to the temperature sensor 131, and a reset signal generator 133 connected to the microcontroller 132. The temperature sensor 131 is adjacent to the power output port 11 to sense a shell temperature of the power output port 11. The temperature of the power output port 11 is changed upon outputting the operating power, and the temperature sensor 131 senses a change of the shell temperature of the power output port 11 to generate a temperature signal 130. It should be noted that "being adjacent" herein is a situation where the temperature sensor 131 is attached or in close proximity to the power output port 11. In an embodiment, the temperature sensor 131 is a thermistor that generates a resistance change based on sensed heat, thereby inducing a voltage signal change in a branch to which the thermistor belongs. The voltage signal is viewed as the temperature signal 130 herein.

Furthermore, the microcontroller 132 receives the temperature signal 130 and is electrically connected to the power output port 11. The microcontroller 132 is a main task manager of the power supply 10 or a logic controller for some circuits according to implementation requirements. The microcontroller 132 is connected to the power output port 11 to sense an output current from the power output port 11, wherein the output current is utilized as a current signal to determine the status of the power output port 11 in the future. The microcontroller 132 is pre-loaded with at least one logic operation program that defines at least one port status alert condition whose primary decision factors are the current signal and/or the temperature signal 130. When the port status alert condition is triggered, the microcontroller 132 generates an alert signal 120. The magnitude of the above decision factor is set according to actual usage requirements, the type and specification of the power output port 11, and the like. For example, in an embodiment, the port status alert condition is determined based on the temperature change of the power output port 11 over a period of time represented by a plurality of temperature signals 130. If the temperature change of the power output port 11 described by the plurality of temperature signals 130 is less than the port status alert condition, the microcontroller 132 does not generate the alert signal 120; and if the temperature change of the power output port 11 described by the plurality of temperature signals 130 is equal to or greater than the port status alert condition, the microcontroller 132 generates the alert signal 120. Moreover, in another embodiment, the port status alert condition is determined based on a temperature signal 130, for example, the microcontroller 132 generates the alert signal 120 when the temperature of the power output port 11, as described by the temperature signal 130, reaches a default threshold. Similarly, in some embodiments, the port status alert condition is determined based on a single current signal or the change of a plurality of current signals, which will not be described in detail herein. In addition, in the above-mentioned embodiment, only a single decision factor (e.g., the temperature signal 130 or the current signal alone) is taken as an example, but in practice, the port status alert condition is not limited to a single decision factor. Instead, a logical determination can be made by combining the temperature signal 130 and the current signal as a composite factor. Further, the form of the alert signal 120 can be various; the alert signal 120 can take the form of a change in the potential of a pin of the microcontroller 132 or a bit stream containing an execution.

Figure 7:
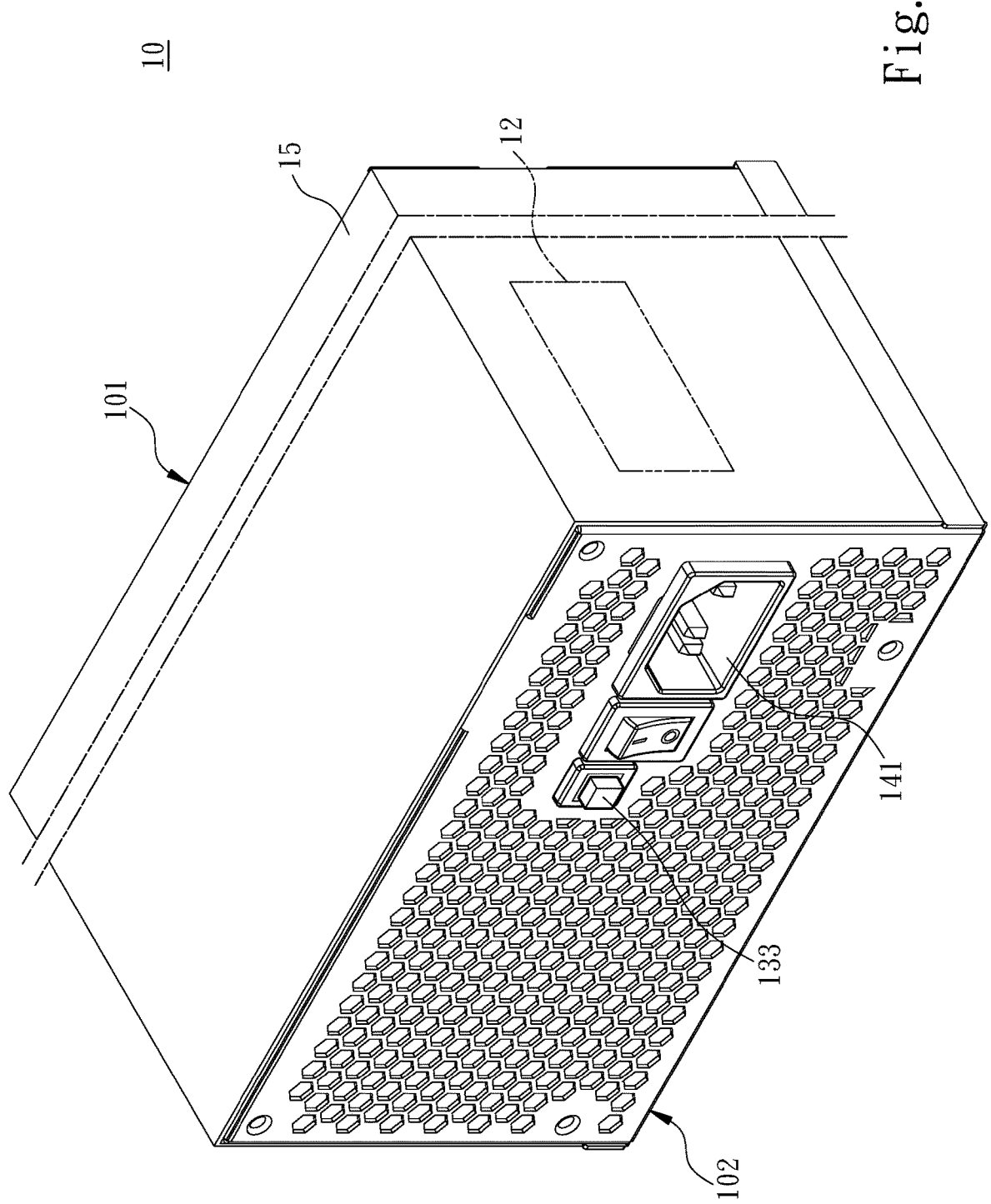
FIG. 7 is a perspective view of a structure of a fourth embodiment of the present invention.

Furthermore, the microcontroller 132 generates the alert signal 120 and transmits the alert signal 120 to the status alert component 12. The status alert component 12 receives the alert signal 120 and then generates at least one visual prompt. It should be understood that the visual prompt generated by the status alert component 12 is intended to remind a user, that is, it is necessary that the visual prompt be sufficient to draw the user's attention, but the position of the status alert component 12 is not specially defined herein. For example, when the status alert component 12 is a display screen, the display screen may display the visual prompt in the form of, for example, a text message, a code, or even an image logo. In this embodiment, the status alert component 12 needs to be exposed on the surface of the power supply 10, as shown in FIG. 7. When the status alert component 12 is a light-emitting element, the light-emitting element uses a change in the brightness and color of light, a change in the flashing rate of light, or the like, as the visual prompt. If a shell 15 of the power supply 10 can be seen through, the light-emitting element is provided within the shell 15, and if the shell 15 cannot be seen through, the light-emitting element is provided on the surface of the power supply 10. Further, the see-through effect described herein may be possible by hollowing out the shell 15 and is not limited to a transparent material.

Furthermore, the reset signal generator 133 is provided on the power supply 10, and the reset signal generator 133 disables the alert of the status alert component 12. The reset signal generator 133 generates a reset signal 135 when operated, and the reset signal 135 is transmitted to the microcontroller 132, so that the microcontroller 132 no longer controls the status alert component 12. In an embodiment, the reset signal generator 133 is a push switch.

Next, an implementation of the power supply 10 is described. It is assumed that initially, the output current from the power output port 11 and the temperature thereof have not reached the port status alert condition and that the microcontroller 132 has not output the alert signal 120 to the status alert component 12. Once the current signal output from the power output port 11 reaches the port status alert condition, the microcontroller 132 is triggered to generate the alert signal 120, and the status alert component 12 receives the alert signal 120 to generate the visual prompt. Thereafter, the microcontroller 132 remains active, keeps driving the status alert component 12 to generate the visual prompt until the microcontroller 132 receives the reset signal 135. When the microcontroller 132 receives the reset signal 135, the action of the microcontroller 132 is disabled, causing the status alert component 12 to cease generating the visual prompt. Herein, how the signal is retained is not specifically defined in the present invention, and one of ordinary skill in the art may practice the same according to the prior art. Hereafter, to facilitate the understanding of the present invention, the following examples are described below.

Example 1: When the port status alert condition is triggered, the microcontroller 132 clamps an output power level of the pin until the reset signal 135 is received, so that before the microcontroller 132 receives the reset signal 135, the microcontroller 132 keeps the action and the status alert component 12 is maintained in an alerting state.

Example 2: The microcontroller 132 sets a clamping voltage for the pin, and when the power supply 10 is completely turned off and restarted, the microcontroller 132 fixes the power level of the pin under the clamping voltage, thereby maintaining the output of the pin. In other words, the microcontroller 132 stops fixing the power level of the pin thereof under the clamping voltage only after receiving the reset signal 135, and the pin is connected to the status alert component.

Example 3: The microcontroller 132 includes at least one non-volatile random-access memory. After the microcontroller 132 transmits the alert signal 120, the alert signal 120 is stored in the non-volatile random-access memory. When the microcontroller 132 is restarted, the information stored in the non-volatile random-access memory still causes the microcontroller 132 to provide the alert signal 120 to the status alert component 12 upon operation.

Accordingly, given the configuration of the microcontroller 132 of the invention, when the port status alert condition is triggered, the microcontroller 132 drives the status alert component 12, and the status alert component 12 reminds the user of checking the power supply 10. More specifically, even if the power supply 10 of the invention is restarted due to its own exception protection mechanism, the microcontroller 132 continues to drive the status alert component 12 after the power supply 10 is restarted, instead of stopping driving the status alert component 12, until the reset signal 135 is received, thereby ensuring the user is reminded of performing a preliminary visual inspection of the power supply 10.

With reference back to FIGS. 1, 2, 3, and 4, the microcontroller 132 controls the status alert component 12 to generate different visual prompt effects to help the user identify the meaning represented by the visual prompt, such as different changes of light colors and different flashing rates, according to different situations where the power output port 11 meets the port status alert condition. For example, when the output current from the power output port 11 reaches a critical value, the visual prompt is a yellow light flashing once per second, and when the output current from the power output port 11 exceeds a critical value, the visual prompt is a red light flashing once per second. In another example, when the temperature of the power output port 11 reaches a critical value, the visual prompt is a yellow light signal flashing once every three seconds, and when the temperature of the power output port 11 exceeds the critical value, the visual prompt is a red light flashing once every three seconds.

Furthermore, in the embodiment that the power supply 10 are provided with a plurality of power output ports 11, the output port status monitoring module 13 includes a plurality of temperature sensors 131, and each of the plurality of temperature sensors 131 corresponding to one of the plurality of power output ports 11. Moreover, the visual prompt generated by the status alert component 12 is sufficient for the user to identify to which of the plurality of power output ports 11 the alert is directed. For example, the visual prompt flashes once per second when one of the plurality of power output ports 11 meets the port status alert condition, and flashes twice per second when another of the plurality of power output ports 11 meets the port status alert condition. Similarly, the visual prompt may also be changes of light colors, which will not be detailed here.

Figure 2:
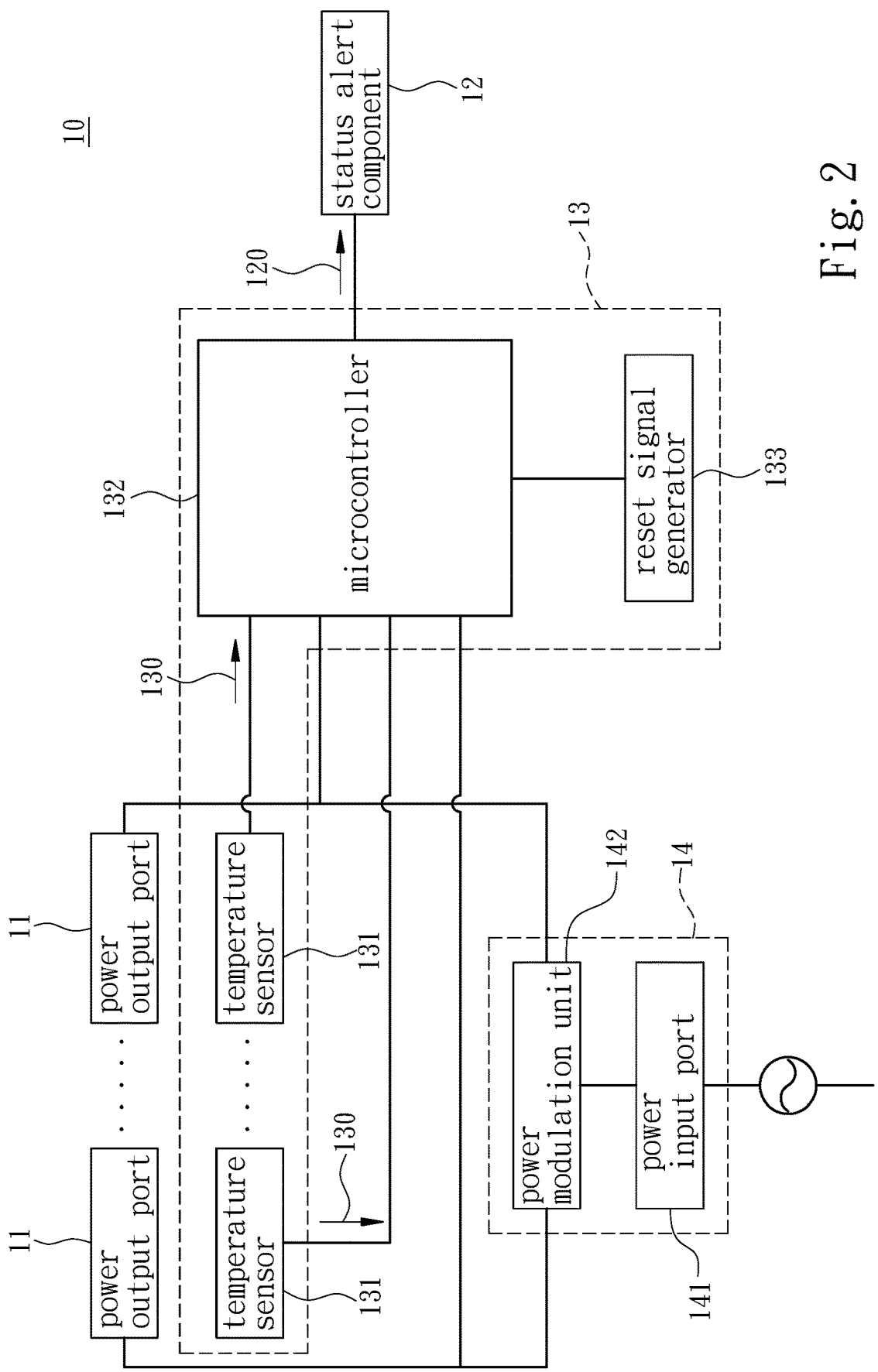
FIG. 2 is a first component schematic diagram of the first embodiment of the present invention.
Figure 3:
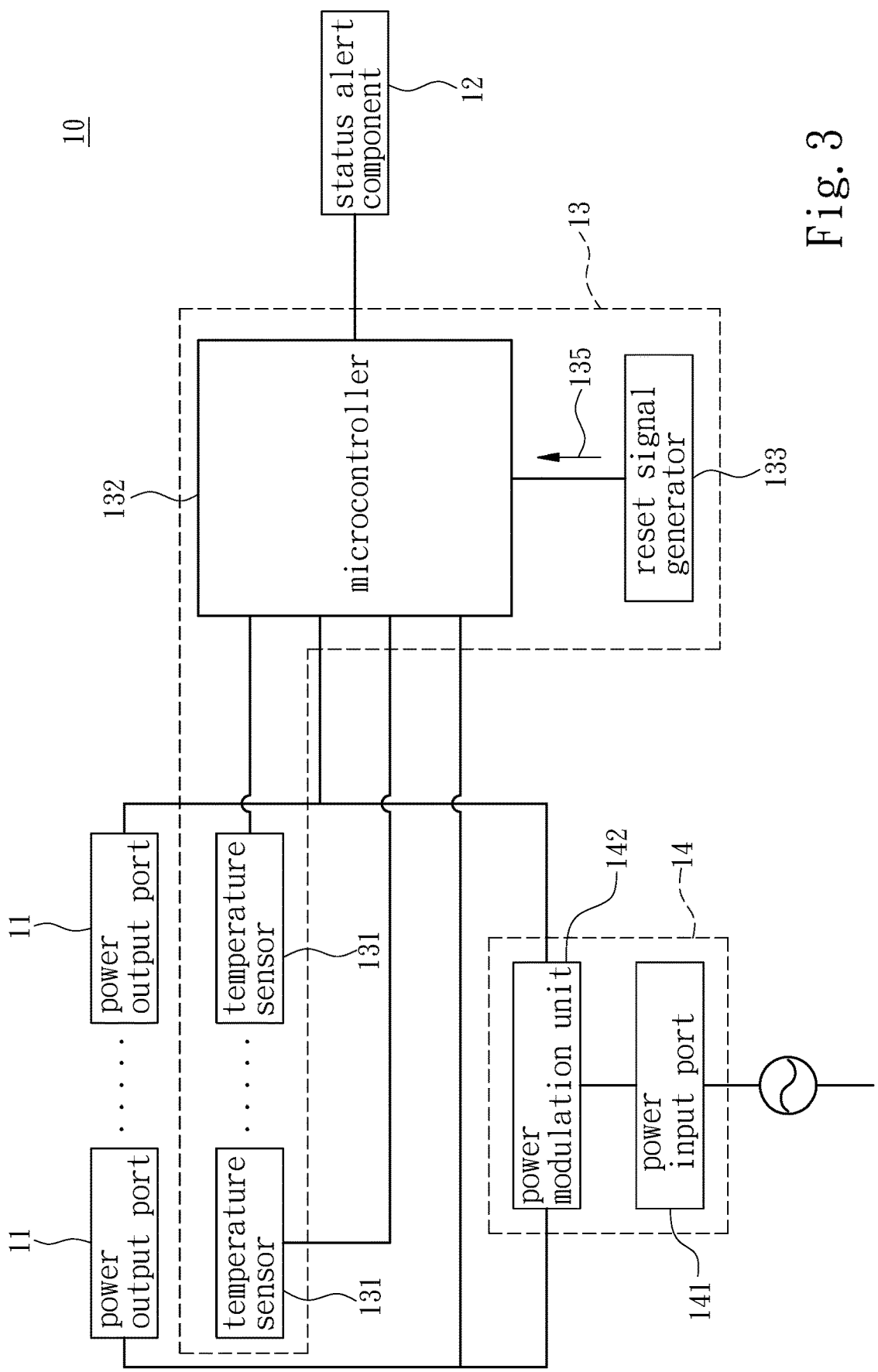
FIG. 3 is a second component schematic diagram the first embodiment of the present invention.
Figure 4:
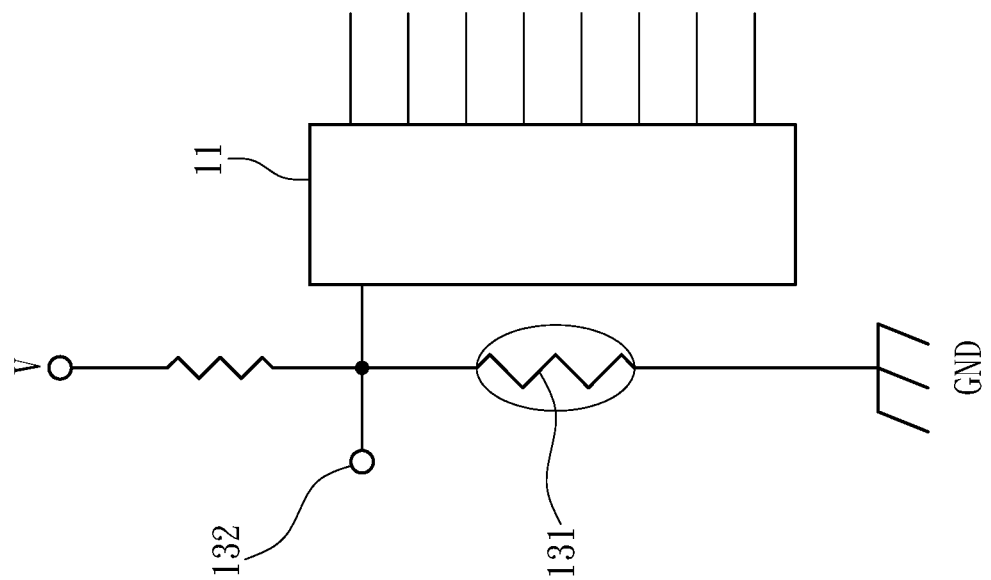
FIG. 4 shows a circuit of the first embodiment of the present invention.
Figure 6:
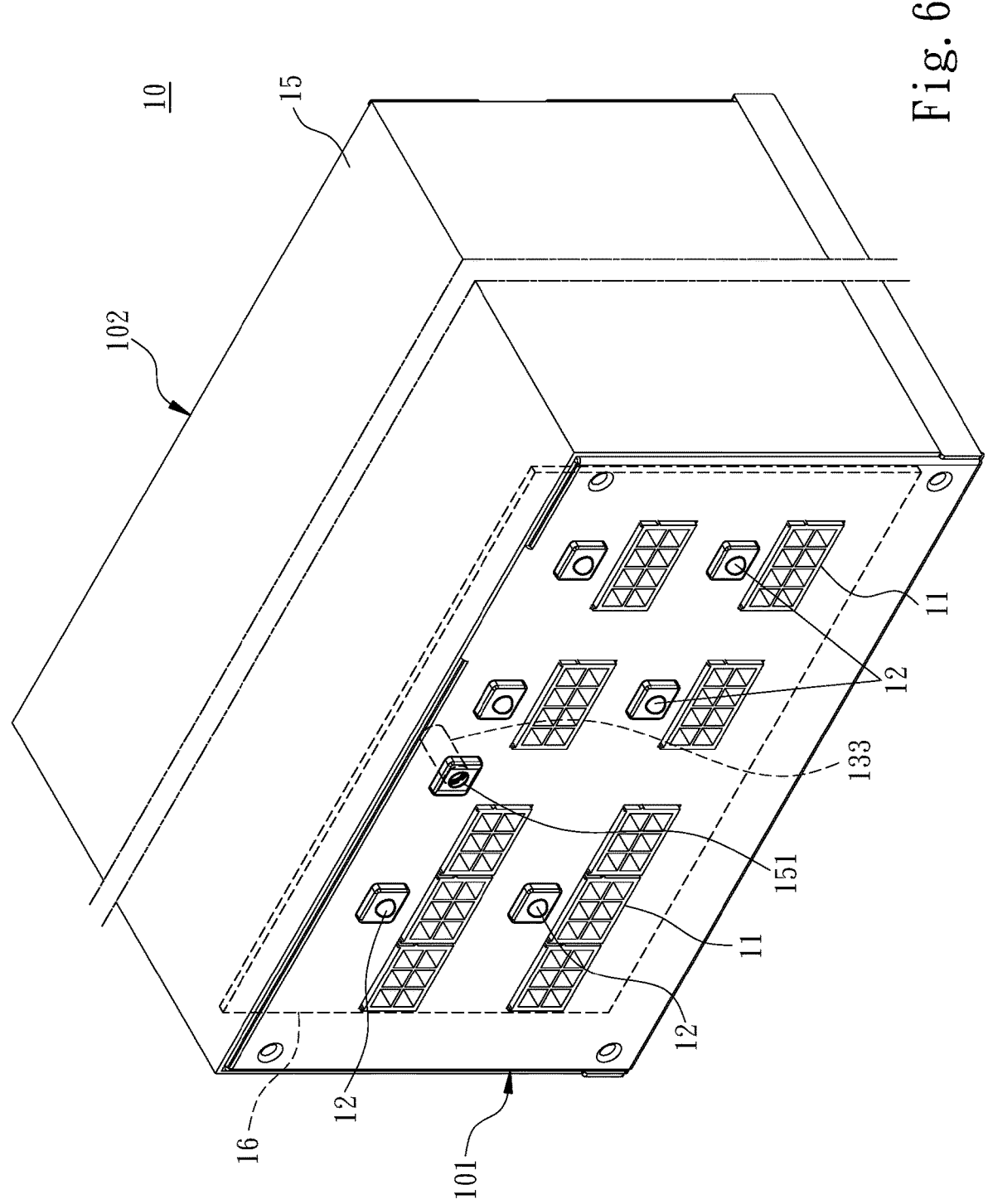
FIG. 6 is a perspective view of a structure of a third embodiment of the present invention.

With reference to FIG. 2, FIG. 3, and FIG. 6, the power supply 10 of the invention may also be provided with a plurality of status alert components 12, wherein the plurality of status alert components 12 are the light-emitting elements, each of which corresponds to at least one of the plurality of power output ports 11. The microcontroller 132 controls one of the plurality of status alert components 12 in situations where a corresponding one of the plurality of power output ports 11 meets the port status alert condition, whereby the user can identify which one of the plurality of status alert components 12 has exception on the basis of to which status alert component 12 the visual prompt is directed.

In addition, with reference to FIGS. 1, 2, 3, and 4, the reset signal generator 133 of the invention is an operative member on the input side 102 of the power supply 10, and the operative member is exposed on the surface of the power supply 10. In this embodiment, the reset signal generator 133 is a controller of other tasks of the power supply 10, such as the fan control of the power supply 10. The reset signal generator 133 is configured to issue the reset signal 135 after a continuous number of operations, where the continuous number is defined such that the reset signal generator 133 must reach a predetermined number of operations within a short period of time, and the number of operations is zeroed when the reset signal 135 is not processed for a certain period of time.

Figure 5:
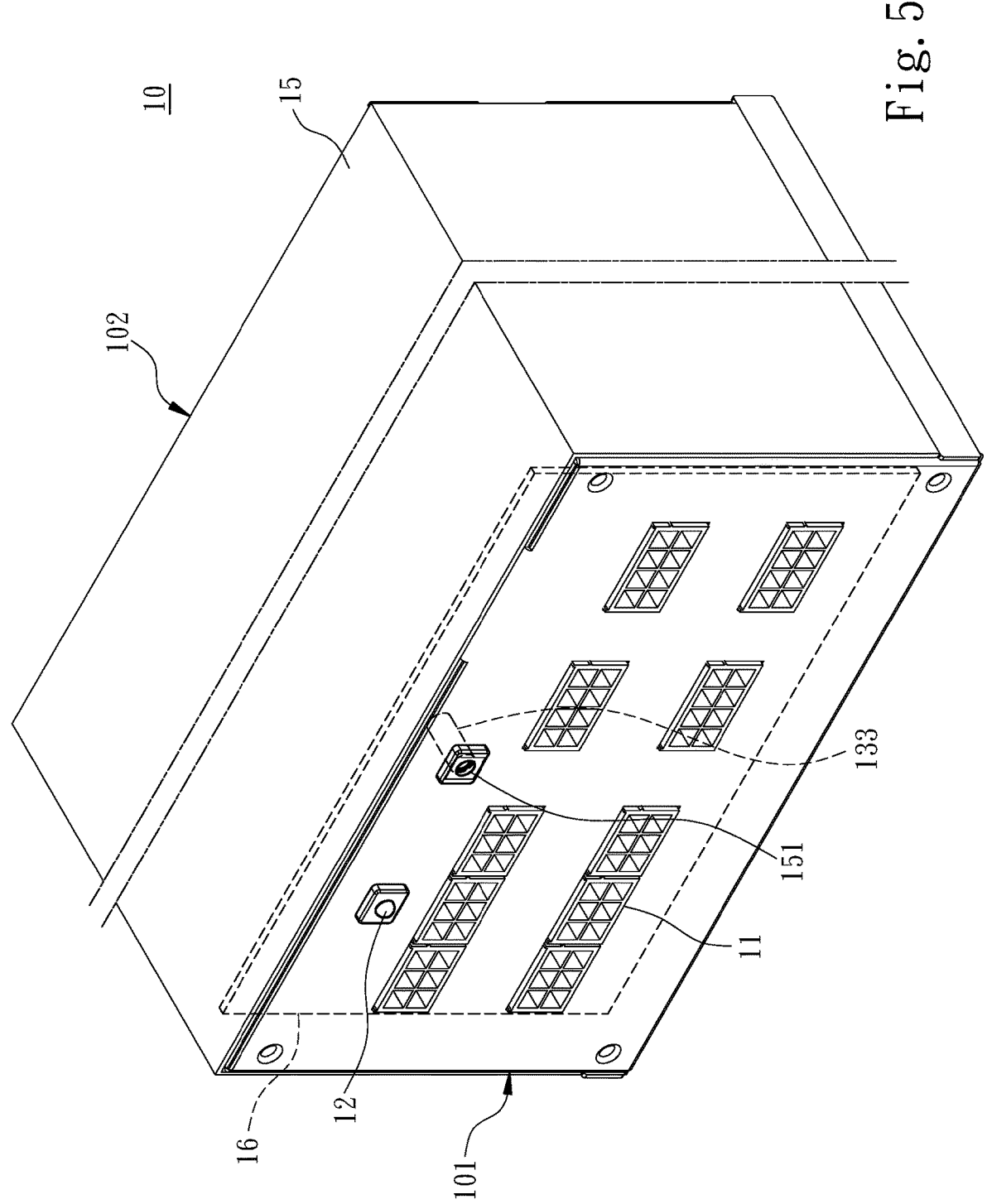
FIG. 5 is a perspective view of a structure of a second embodiment of the present invention.

In another embodiment, with reference to FIG. 5 and FIG. 6, when the reset signal generator 133 is provided on the output side 101 of the power supply 10, the reset signal generator 133 is not exposed on the surface of the power supply 10. In the present embodiment, the power supply 10 has a circuit board 16 provided in the shell 15, and the circuit board 16 is one of a working motherboard, a microcontroller board plugged onto the working motherboard, and an output backplane electrically connected to the working motherboard and located on the output side 101 of the power supply 10. The circuit board 16 is provided with the reset signal generator 133 thereon, and the shell 15 is formed with a hole 151 corresponding to the position of the reset signal generator 133. The hole 151 allows the user to insert in from the outside of the power supply 10 with a tiny tool to trigger the reset signal generator 133. In this embodiment, the reset signal generator 133 is not exposed out of the hole 151 to reduce the risk of the reset signal generator 133 being triggered by mistake.

In an embodiment, the reset signal generator 133 is further configured to be pressed for a set period of time before the reset signal 135 is sent. That is, when the reset signal generator 133 is pressed for less than the set period of time, the reset signal generator 133 does not generate the reset signal 135, thereby avoiding the unexpected operation of the reset signal generator 133 by mistake.

Figure 8:
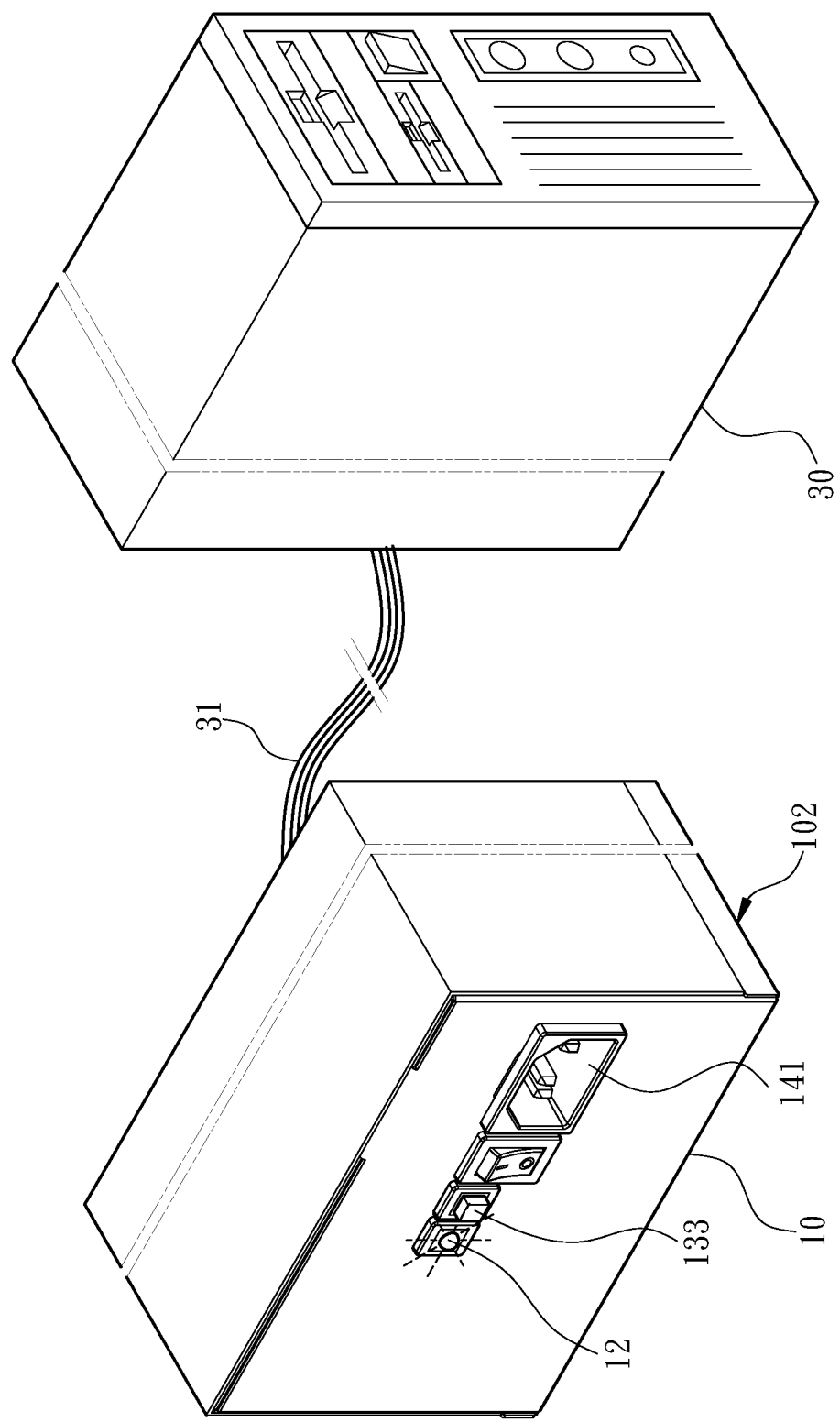
FIG. 8 is a perspective view of a structure of a fifth embodiment of the present invention.
Figure 9:
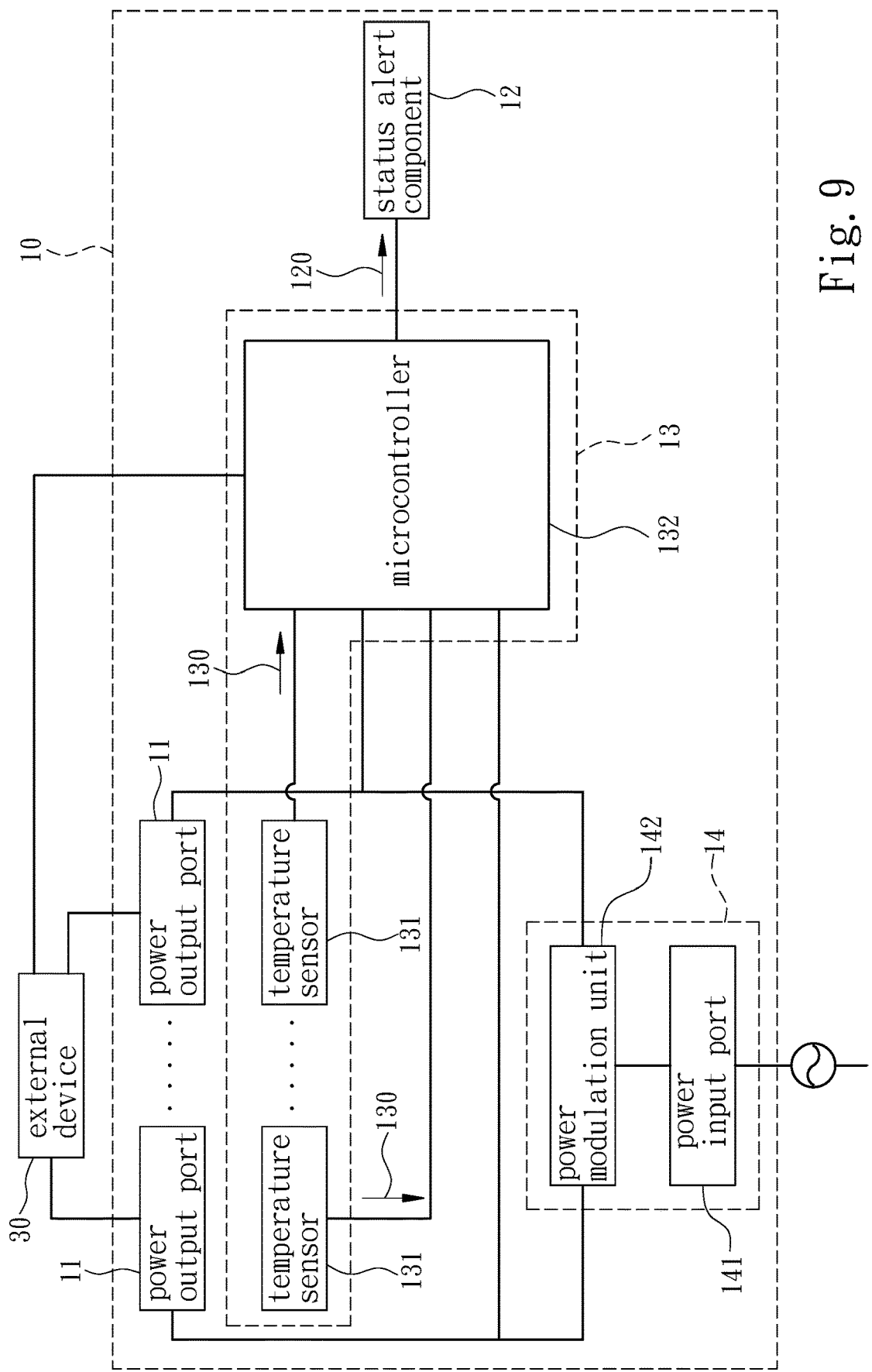
FIG. 9 is a first component schematic diagram of the fifth embodiment of the present invention.
Figure 10:
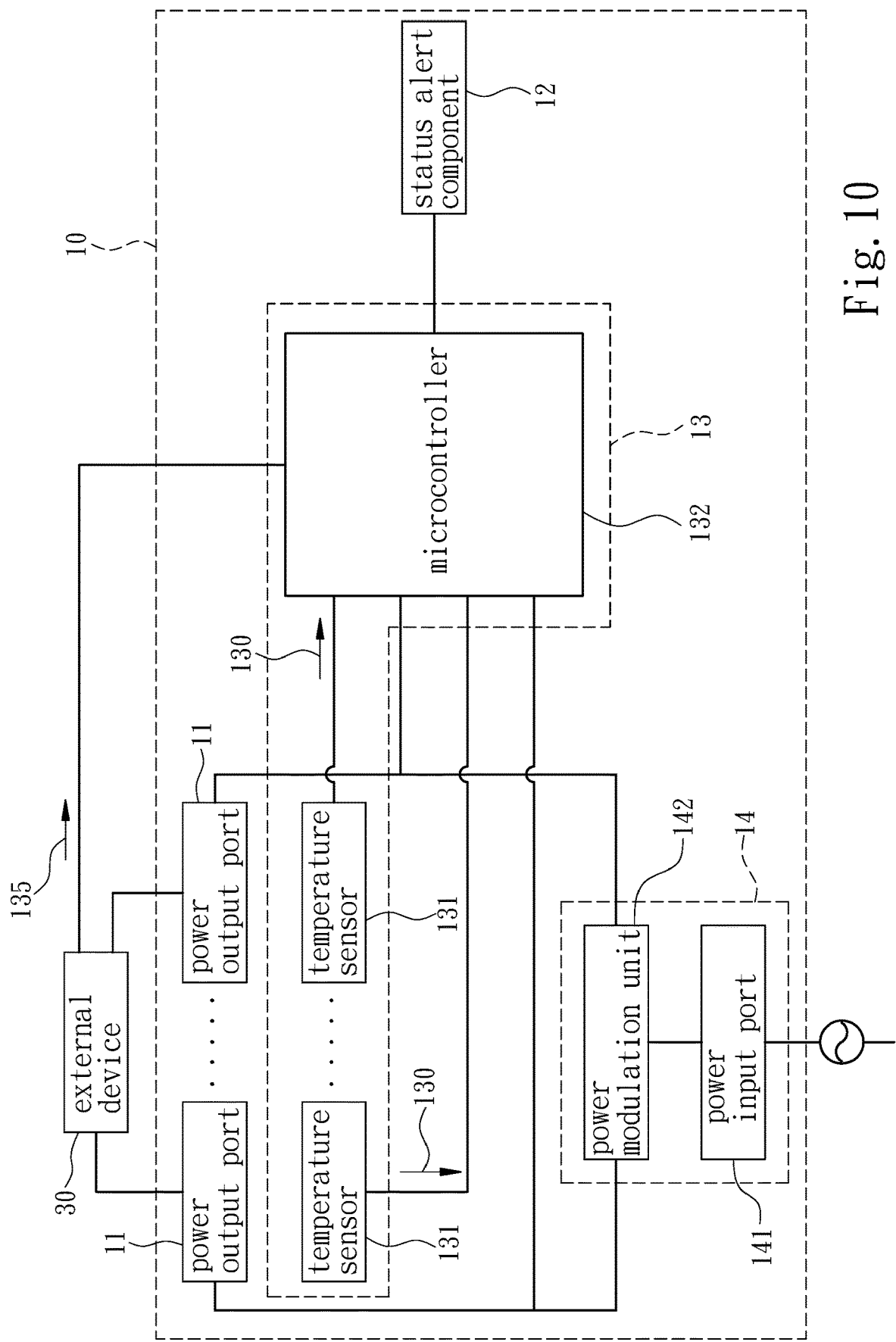
FIG. 10 is a second component schematic diagram of the fifth embodiment of the present invention.

In addition to the foregoing, with reference to FIGS. 8, 9, and 10, the power supply 10 according to the present invention can also cancel the alert of the status alert component 12 by an external device 30. Specifically, the power supply 10 is connected to the external device 30, and the external device 30 is a power receiver, that is, the power supply 10 supplies all the power required for the operation of the external device 30. In an embodiment, the external device 30 is a computer host electrically connected to the power supply 10 through a plurality of transmission lines 31, wherein some of the plurality of transmission lines 31 transmit electric power, and the others transmit information. The information is an on/off signal (commonly called PS_ON) for controlling the power supply 10, or status information of the power supply. In this embodiment, the external device 30 is the generator of the reset signal 135. The external device 30 starts up and then runs an operation program, which provides, after being controlled by the user, the reset signal 135 to the power supply 10 through those of the transmission lines 31 that serve to transmit information.

What is claimed is:

1. A power supply with an output port status monitoring module, comprising:
    a plurality of power output ports;
    at least one status alert component, generating at least one visual prompt which attracts a user's attention based on an alert signal; and
    at least one output port status monitoring module, comprising a plurality of temperature sensors respectively corresponding to the plurality of power output ports, a microcontroller communicatively connected to the temperature sensors and electrically connected to the power output ports to sense an output current from at least one of the power output ports, and a reset signal generator connected to the microcontroller, wherein the microcontroller stores at least one port status alert condition, and a decision factor of the port status alert condition is defined based on at least one of a temperature and the output current of the at least one of the power output ports, and the microcontroller outputs the alert signal to the status alert component when the port status alert condition is met, and keeps alerting until a reset signal provided by the reset signal generator is received;
    wherein the visual prompt generated by the status alert component is provided for the user to identify to which of the plurality of power output ports the alert is directed.

2. The power supply with the output port status monitoring module according to claim 1, wherein the power supply comprises a shell comprising a hole to which the reset signal generator is fitted.

3. The power supply with the output port status monitoring module according to claim 1, wherein the power supply comprises a shell and at least one circuit board provided in the shell, the shell having a hole, the reset signal generator being provided on the circuit board and facing the hole.

4. The power supply with the output port status monitoring module according to claim 1, wherein the status alert component is a display screen.

5. The power supply with the output port status monitoring module according to claim 1, wherein the power supply comprises a plurality of status alert components, and each of the plurality of status alert components is a light-emitting element.

6. The power supply with the output port status monitoring module according to claim 1, wherein the microcontroller is a task management chip of the power supply.

7. A power supply with an output port status monitoring module, comprising:
- a plurality of power output ports;
- at least one status alert component, generating at least one visual prompt which attracts a user's attention based on an alert signal; and
- at least one output port status monitoring module, comprising a plurality of temperature sensors respectively corresponding to the plurality of power output ports, and a microcontroller communicatively connected to the temperature sensors and electrically connected to the power output ports to sense an output current from at least one of the power output ports, wherein the microcontroller stores at least one port status alert condition, and a decision factor of the port status alert condition is defined based on at least one of a temperature and the output current of the at least one of the power output ports, and the microcontroller outputs the alert signal to the status alert component when the port status alert condition is met and keeps alerting until a reset signal provided by an external device is received;
- wherein the visual prompt generated by the status alert component is provided for the user to identify to which of the plurality of power output ports the alert is directed.

8. The power supply with the output port status monitoring module according to claim 7, wherein the external device is a computer host communicatively connected to the power supply.

9. The power supply with the output port status monitoring module according to claim 7, wherein the status alert component is a display screen.

10. The power supply with the output port status monitoring module according to claim 7, wherein the power supply comprises a plurality of status alert components, and each of the plurality of status alert components is a light-emitting element.

11. The power supply with the output port status monitoring module according to claim 7, wherein the microcontroller is a task management chip of the power supply.

* * * * *